United States Patent [19]

Tamura et al.

[11] 4,340,297

[45] Jul. 20, 1982

[54] DEVICE FOR DRIVING COPY BOARD OF A COPYING MACHINE

[75] Inventors: Takashi Tamura, Higashimine; Yasuyuki Iwai, Hachioji, both of Japan

[73] Assignee: Konishiroku Photo Industry Co., Ltd., Tokyo, Japan

[21] Appl. No.: 123,372

[22] Filed: Feb. 21, 1980

[30] Foreign Application Priority Data

Feb. 21, 1979 [JP] Japan .................................. 54/18424

[51] Int. Cl.³ ............................................. G03B 27/48
[52] U.S. Cl. ......................................... 355/50; 355/8
[58] Field of Search ....................... 350/48, 49, 50, 51, 350/8

[56] References Cited

U.S. PATENT DOCUMENTS

| 3,635,554 | 1/1972 | Hodges | 355/8 |
| 3,741,646 | 6/1973 | Knechtel et al. | 355/50 |
| 4,026,647 | 5/1977 | Kanno et al. | 355/8 |
| 4,161,359 | 7/1979 | Masham | 355/8 |
| 4,183,660 | 1/1980 | Bujese | 355/51 |

Primary Examiner—Monroe H. Hayes
Attorney, Agent, or Firm—James E. Nilles

[57] ABSTRACT

A device for driving the copy board of a copying machine comprising a driving member adapted to perform a reciprocating movement during the copying operation, a copy board engaged with the driving member, and at least one switch adapted to detect whether or not the copy board has been disengaged from the driving member when the copy board and driving member are in the vicinity of the starting position. The copy board is disengaged from the driving member by a force greater than a predetermined level of force applied thereto in the direction of reciprocation.

9 Claims, 4 Drawing Figures

DEVICE FOR DRIVING COPY BOARD OF A COPYING MACHINE

BACKGROUND OF THE INVENTION

1. Field of the Invention:

The present invention relates to an improvement in a device for driving the copy board of a copying machine.

2. Description of the Prior Art:

The copy board driving device of a conventional copying machine having a reciprocating copy board has a driving member which is unitarily connected to the reciprocative copy board and adapted to move reciprocatively together with the latter. When an external force which would prevent the reciprocative movement is applied to the copy board, the driving force is conveniently absorbed by clutch means, such as a friction clutch or the like, incorporated in a transmission system, so that the driving device may be protected against any damaging force.

Since it is not permissible to cause a phase differential between the copy board and its associated members, the clutch means is disposed at the power-side so that coincidence of phase may be achieved easily. Therefore, the clutch means is required to transmit a large torque for driving not only the copy board but also the other moving parts such as a photosensitive drum and a paper-feeding device. Therefore, the safety function or slipping in the clutch means is not achieved unless a very large external force is applied to the copy board. Alternatively, the clutch means is required to exhibit highly precise operation. If the clutch means is mounted on the same side as the reciprocative driving member, a complicated mechanism is required for matching the phase of the copy board and its associated members.

Further, in a known type of copying machine the reciprocating copy board extends out of the copying machine body when the power switch is turned on. The copy board is capable of being stored in the copying machine body without projecting therefrom when in operative condition. This is preferred in consideration of designing a compact machine. In such a machine, if it is used in confined office space and the copy board projects into an aisle during a copying operation, it will become an obstacle to workers moving in the aisle. Therefore, it is desirable that the copy board be retracted into the machine body. However, it is troublesome to do so in the case in which a clutch is mounted on the power side of the driving member, as mentioned above, since it has to be operated after the power switch is turned off. Besides, when the copying operation is started from this condition after the power switch is turned on, the first copy comes to nothing, because matching of the phase of the copy board, rotation of the photosensitive member, the sheet supplying operation and so forth cannot be achieved on the first copying operation.

SUMMARY OF THE INVENTION

It is, therefore, an object of the invention to provide a driving mechanism for the copy board of a copying machine, such as electrophotographic copying machine, which is entirely free from the above-described problems of the prior art, and which includes a device which can perform a safety function against an external force applied to the copy board irrespective of the movement of other movable parts and which can provide easy phase matching between movements of the copy board and the other movable parts. More particularly, another aim of the invention is to provide a device capable of detecting a deviation from normal of copy board of the copying machine.

DETAILED DESCRIPTION OF THE PREFERRED EMBODIMENTS

Figure 1:
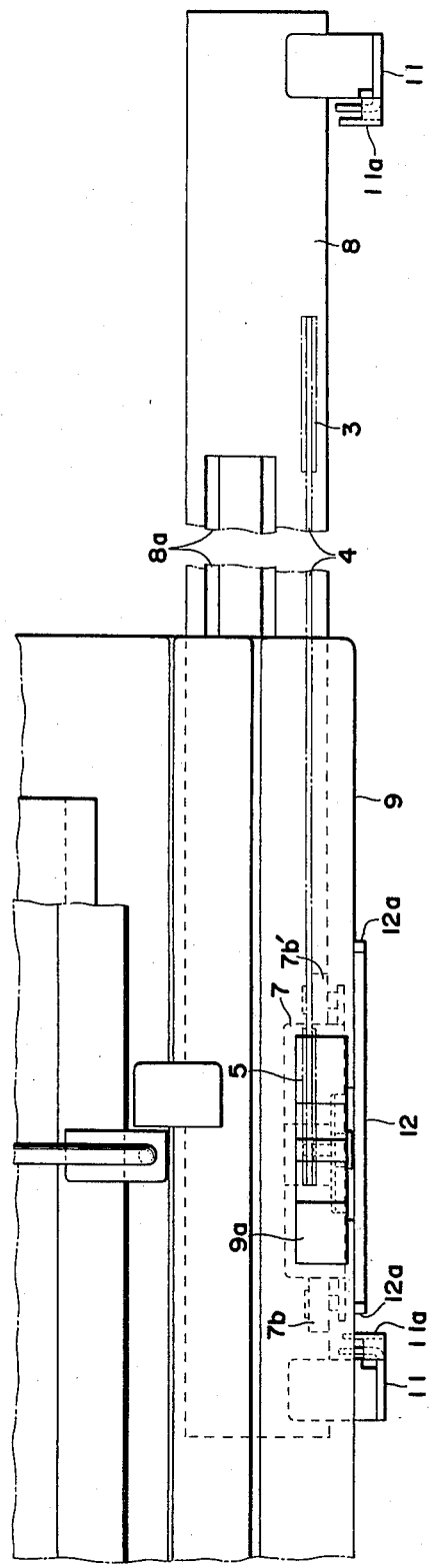
FIGS. 1, 2 and 3 are a plan view, a front elevational view and a sectional side elevational view of the copy board driving device for a copying machine, respectively constructed in accordance with one embodiment of the invention.

Referring to the Figures, reference numeral 1 denotes a driving chain which is powered by an electric motor M and adapted to drive a copy board 9, as well as other movable parts such as a photosensitive drum which is not shown. A reference numeral 2 denotes a chain roller (sprocket wheel) which is directly driven by the driving chain 1, while a reference numeral 3 denotes a power-side chain roller (sprocket wheel) associated with the copy board and adapted for rotation together with the chain roller 2. A copy board driving chain 4 is stretched between the power-side chain roller 3 and a driven-side chain roller (sprocket wheel) 5. The copy board driving chain 4 is operated or rotated in one direction through the driving chain 1, chain roller 2 and the power side chain roller 3 when main motor M. which is connected to a photosensitive member or a drum (not shown) is turned on. A traveller roller 6 is attached to the copy board driving chain 4. The traveller roller 6 is slidably received by a slide groove 7a of a driving member 7, and is adapted to reciprocatively drive the driving member 7 in accordance with the running of the copy board driving chain 4. The driving member 7 can be moved with a small force because it has wheels 7b, 7b' which are adapted to roll on rails 8. The driving member 7 is provided with an engaging projection 7c the projection height of which being adjustable. The tip end of the engaging projection 7c is adapted to fit a V-groove formed in a resilient plate 9a attached to the copy board 9.

Namely, in the state in which the tip end of the engaging projection 7c fits the V-groove in the resilient plate 9a, this engagement can transmit a force which is large enough to drive the copy board unitarily with the drive member 7, unless an external force is exerted on the copy board 9. However, in a copying machine having a detachable driving member from the copy board when an external force is forcibly applied to the copy board 9 due to, for example, a collision with an operator or other person, the resilient plate 9a is resiliently deflected to permit the engaging projection to be disengaged from the V-groove, so that the driving member 7 moves leaving the copy board. Therefore, no abnormal force is applied to the driving member and associated parts of the power side. The magnitude of the force which can be transmitted by this engagement can be varied by changing the projection height of the engaging projection 7c. The copy board 9 can be brought again into engagement with the engaging projection 7c by a force which is smaller than the force by which the engaging projection 7c is cut out of the engagement, because the outside of the V-groove of the resilient plate 9a has a gradient which is less steep than the wall of the V-groove.

The copy board 9 has an outer race 9b attached unitarily thereto, while an inner race 8a is attached unitarily to the rail surface 8. Balls 10 are interposed between the inner race 8a and the outer race 9b so that the copy board 9 may be smoothly moved along the rail 8 in the direction of movement of the driving member 7. On the other side of the machine body the rail surface 8, inner and outer races 8a, 9b and so forth are also parallely provided to the one described above. Therefore, the engaging means of the invention between the driving member and the copy board can perform a safety function at a higher sensitivity level against an external force.

A reference numeral 10a denotes a partition plate for holding the balls and is anchored at its one end to the outer race 9b so that the ball may not drop even when the outer race has been disengaged from the inner race 8a.

A reference numeral 11 denotes a stopper which is adapted to automatically or easily bringing the copy board 9 into engagement with the driving member 7, when the copy board 9 is disengaged from the driving member 7.

Namely, when the copy board 9 is disengaged from the driving member 7 during the movement of the latter to take a position ahead of the driving member 7, the tip end of the engaging projection 7c comes to push the copy board 9 upon contacting the outer tapered surface of the resilient plate 9a. Before, the driving member reaches its stroke end, the stopper 11 is contacted by an abutment surface 12a of a collision plate 12 attached to the copy board 9 to stop the further movement of the copy board. Meanwhile, the driving member continuously moves toward the stroke end, so that the engagement between the copy board 9 and the driving member 7 is automatically accomplished by the time of arrival of the driving member at its stroke end. If the driving member 7 is on its rightward stroking, i.e. in the forward stroking in the illustrated embodiment, the engagement is effected by means of the right-hand side stopper 11, whereas, if the driving member 7 is on its leftward stroking, i.e. on the returning stroke, the engagement is effected by the left-side stopper 11.

The automatic engagement is accomplished also when the copy board 9 is disengaged and left behind the driving member 7 during forward stroking of the latter. In this case, the stopper 11 does not work during the forward movement of the driving member. However, as the driving member commences its returning stroking, the situation is the same as the case where the copy board 9 is disengaged and placed ahead of the driving member. Therefore, the engagement is automatically recovered by the action of the left stopper 11.

In contrast to the above, when the copy board 9 is disengaged and left behind the driving member 7 during returning stroking of the latter, it is not possible to automatically achieve the engagement, in case where an electric driving circuit of a type described later is used. Needless to say, if the driving electric circuit is adapted for reciprocatingly drive the driving member even after the disengagement of the copy board, the engagement is automatically received by reciprocatingly moving the driving member by such an electric circuit. In the former case where the engagement is not achieved automatically by means of the electric driving circuit, the copy board 9 is simply pulled until it is stopped by the left stopper 11, so that the engagement can be accomplished simply and without fail. A reference numeral 11a denotes a flexible member for buffering the impact of collision of the copy board with the stopper. In the illustrated embodiment, this stopper is constituted by a leaf spring.

The lower end surface 7d of the driving member 7, and the lower end surface 12b of the abutment plate 12 constitute switch actuating cam surfaces for actuating a first and a second switch S1 and S2. When the driving member 7 engaging the copy board 9 is moved from the right position toward the starting position, at first the lower end surface 12b of the abutment plate 12 actuates the second switch S2 to switch the contact from Y to X and, thereafter, the lower end surface of the driving member 7 turns the switch S1 from ON to OFF state.

To the contrary, when the driving member 7 moves from the starting position to the right together with the copy board 9, at first the lower end surface 7d of the driving member 7 leaves the first switch S1 to turn the latter from OFF to ON state, and, thereafter, the lower surface 12b of the abutment plate 12 leaves the second switch S2 to switch the contact from X to Y. Therefore, in the state in which the driving member 7 and the copy board 9 are in the starting position, the switch S1 is in OFF state, while the X contact is closed in the switch S2.

Figure 4:
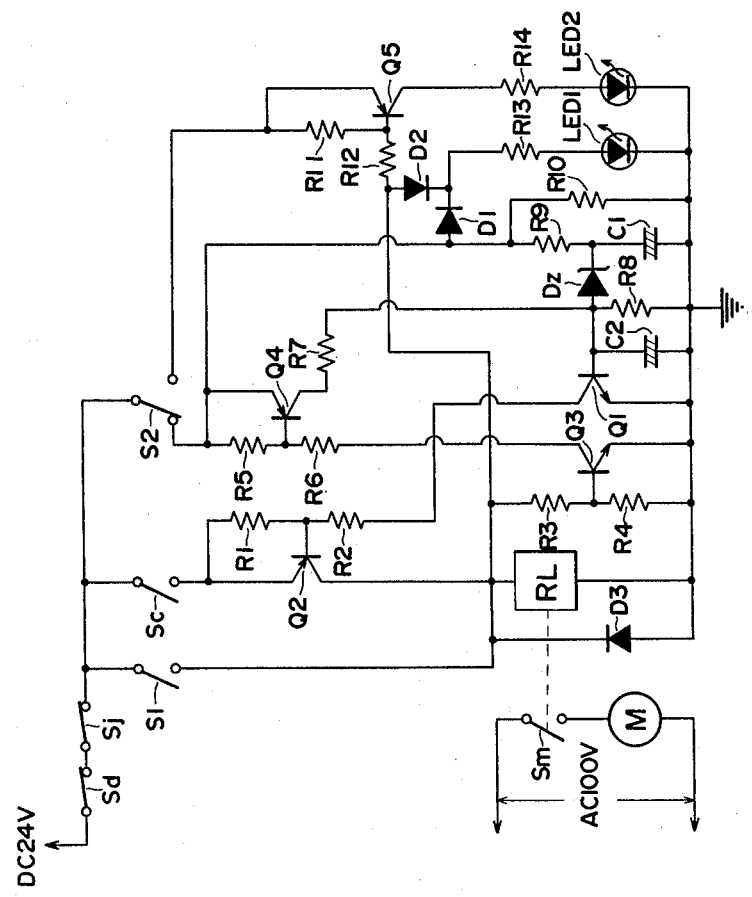
FIG. 4 is a circuit diagram of an electric driving circuit.

Hereinafter, a description will be made how the copy board is driven by means of the electric driving circuit shown in FIG. 4.

Symbols Sd and Sj represent, respectively, a door switch adapted to be turned on by the opening of a door (not shown) and a jam detecting switch which is adapted to be turned off in case of jamming of paper. Needless to say, both switches are in ON state when the copying machine is in an operative condition. A copy switch is represented by a symbol Sc. In case of a single copy, the driving member 7 is started as the copy switch Sc is turned on, so that the first switch S1 is also turned on and the second switch S2 is switched from X to Y contact. The copy switch is turned off by the time when the first switch S1 is turned off. In case of multiple copying, the operation is started as the copy switch is turned on. The copy switch Sc is turned off by the time when the first switch S1 is turned off in the last copying cycle.

Referring first to single copy, when the driving member 7 is in the starting position and engaged by the copy board 9, the switches S1 and S2 take the illustrated position, so that a capacitor C1 is charged up to the voltage of the power source through the switch S2 which is connected to the contact X, and a bias voltage is applied to the base of a transistor Q1 through a Zener diode Dz. At the same time, a light emitting diode LED1 is energize through a diode D1 to display that the machine is ready for copying operation.

Then, as the copy switch Sc is turned on, a forward voltage is applied to the collector of the transistor Q1 through resistors R1, R2 so that the transistor Q1 is turned on. In consequence, a transistor Q2 is turned on also, so that a relay RL operates to turn on the motor circuit switch Sm, thereby to start the motor M. As a result, the driving member 7 and, hence, the copy board 9 are started to turn the switch S1 on. This in turn causes a bias voltage to be applied to the base of the transistor Q3 to turn the latter on. Therefore, the transistor Q4 is also turned on to lower the base voltage of the transistor Q1 to turn off the latter again. As the transistor Q1 is turned off, the transistor Q2 is also turned off to make the copy switch Sc independent from the operation of the relay RL. Thus, the relay RL in this state operates solely by the power supplied via the switch S1. In other words, many processes for an electrophotographic copying are carried out in accordance with the forwarding movement of the copy board 9, required in order. The description of machine construction for such processes is omitted, since it is well known, except for the mechanical engagement of copy board which is detachably connected to the driving member. The turning off of the copy switch Sc is made at a suitable timing until the switch S1 is turned off.

Then, the second switch S2 is turned to the contact Y. The relay RL operates by means of the circuit of the switch S1, and the LED1 also continues to light by the action of the circuit of the switch S1.

Figure 2:
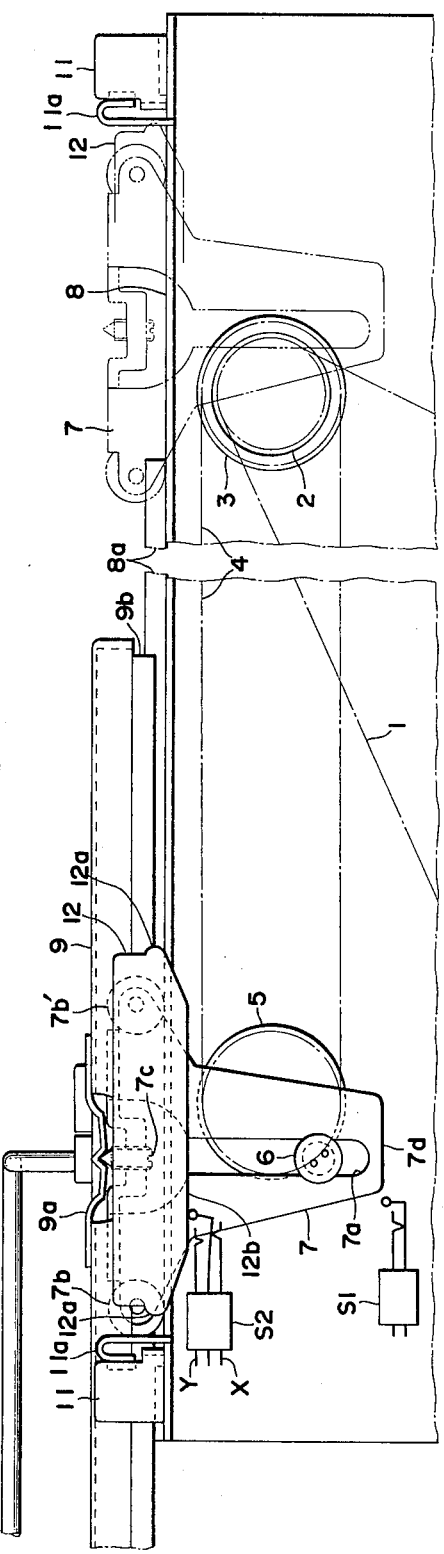
Figure 3:
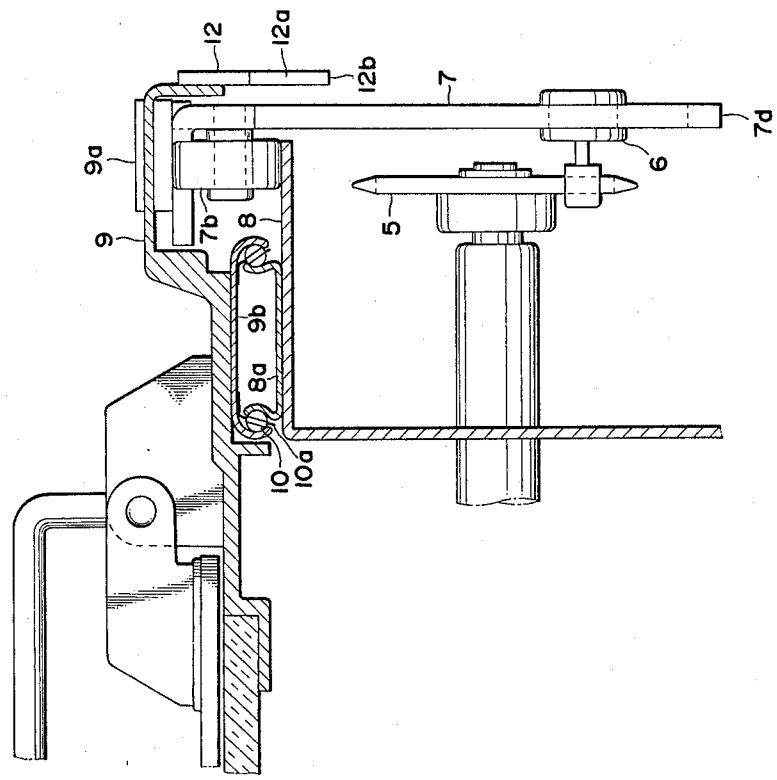

Then, as the driving member 7 and the copy board 9 approach the starting position, the switch S2 is switched to contact X again. Since this state is same as that described before, the motor M continues to run and the switch S1 is turned off as the driving member approaches the starting position. Since the copy switch Sc has been turned off, the relay RL is deenergized as the switch S1 is turned off and the motor circuit switch Sm is turned off to stop the motor M. In consequence, the driving member 7 and, hence, the copy board 9 are stopped at the starting position shown in FIG. 1 or 2.

If the copy board 9 has been disengaged from the driving member 7 and offset from the latter completely to the right, the second switch S2 is switched to contact Y, so that the electric current flows through the resistors R11 and R12, as well as resistors R3 and R4. The transistor Q5 therefore is turned on to make a light emitting diode LED2 illuminate to indicate to the machine operator that the copy board has been disengaged. Since the transistors Q1 and Q2 are in off state, the relay RL does not operate even by a depression of the copy switch Sc, so that the motor M does not operate.

If the driving member 7 is brought out of engagement with the copy board 9 during the movement thereof, the motor M continues to rotate because the switch S1 is kept on, until the driving member is brought back to the starting position. Thus, as in the case where the driving member is kept in engagement with the copy board, the motor M is stopped only after the driving member is brought back to the starting position to turn the switch S1 off. In this case, the copy board is brought to the starting position by hand of the operator so as to be engaged with a driving member for preparing the next copying operation.

Hereinafter, a description will be made as to how a multiple copy is performed. In case of the normal running, the motor M starts to rotate as the copy switch Sc is turned on, and the driving member 7 is started and brought back again to the position near the starting position to turn the switch S2 to the contact X and then to turn off the switch S1, as in the case of the single copy. In case of the multiple copy, however, the copy switch Sc is never turned off until the last copying operation is started, even if the first switch S1 is turned off meanwhile. Therefore, as the transistors Q3 and Q4 are turned off as a result of turning off of the switch S1, the base voltage of the transistor Q1 is raised to turn the transistors Q1 and Q2 on, so that the relay RL is energized to start the motor M again. In consequence, the driving member 7 and the copy board 9 turn to the next copying operation. After a predetermined number of repetition of above-explained cycle of operation, the copy switch Sc is turned off as in the case of the single copying operation, so that the machine is completely stopped by the turning off of the switch S1.

If the copy board 9 has been disengaged from the driving member 7 before the start of the multiple copying operation, the switch S2 has been switched to the contact Y, so that the light emitting diode LED2 illuminates and the machine cannot be started even by a depression of the copy switch Sc, as in the case of the single copying operation.

If the copy board is disengaged from the driving member 7 on the way of copying operation, the switch S2 keeps contact with the Y contact when the switch S1 is turned off by the driving member which has returned to the starting position. Therefore, the transistors Q1 and Q2 are never turned on and the motor M does not start, even when the copy switch Sc is turned on. In consequence, the transistor Q5 is turned on to make the light emitting diode LED2 illuminate for informing this engagement therebetween to the operator. In such a case, the copying operation will be started again by bringing the copy board 9 into engagement with the driving member 7 in the manner described before.

As has been described, according to the invention, the copying machine does not start if the copy board has disengaged from the driving member due to an external force applied thereto, so that the failure of a copying operation is minimized. In addition, resetting can be done quite easily, without destroying the matching of phase between the copy board and other associated movable parts. It is also to be noted that these advantages are accomplished by a highly complicated construction.

The invention is not limited to the illustrated embodiment. For instance, the reciprocative means for driving the driving means may be constituted by a combination of a rack and pinion which is movable in either direction. Also, the means for connection between the driving member and the copy board may be constituted by a magnet. Further, a swingable lever having a projection for engagement with the copy board, which being capable of operation by the machine operator, can be used as modification of the abutment plate 12. In this case, for example, the copy board is provided with a slit or hole to allow the insertion of the projection, which has a tapered lower surface. In the event that the external force applied to the copy board acts only in one direction, e.g. in the copying machine in which the copy board projects only in one side of the machine, drive means incorporating the magnet can be used for driving in the direction of projection.

What is claimed is:
1. A device for driving a copy board of a copying machine comprising: a driving member adapted to perform a reciprocating movement during the copying operation; a copy board; releasable engagement means whereby said copy board is releasably engaged with said driving member so as to be reciprocatingly moved along a path of travel by said driving member; said releasable engagement means being responsive to a force greater than a predetermined level of force applied to said copy board in the direction of reciprocation to effect disengagement of said copy board and said driving member; stopper means adapted to contact and stop the motion of said copy board when the latter has been moved to the limits of its path of travel by said driving member; said releasable engagement means being further operable to effect reengagement of said copy board and said driving member when said copy board is at a limit of its path of travel and said driving member arrives at such position and control means including switch means to detect whether or not the copy board has been disengaged from the driving member when the copy board and driving member are in the vicinity of their starting position for reciprocating movement.

2. A device for driving a copy board of a copying machine as claimed in claim 1, wherein said switch means comprises a first switch operated by said driving member when the latter takes a position near its starting position; a second switch operated by the copy board engaged by the driving member taking a position near the starting position; and wherein said control means further comprises a copy switch and an electric driving circuit which permits said copy switch to initiate a copying operation at least when said first and the second switches are in the states operated by the driving member and the copy board, respectively.

3. A device for driving a copy board of a copying machine as claimed in claim 1 or 2, wherein the reciprocating movement of the driving member is effected by a chain which runs in one direction.

4. A device for driving a copy board of a copying machine as claimed in claim 2, wherein said electric driving circuit includes a display circuit which is adapted to display a state in which the first switch is operative, while the second switch is inoperative.

5. A device for driving a copy board of a copying machine as claimed in claim 1 or 2, wherein said driving member is provided with a rack, while a pinion is provided on the reversible power side, whereby the driving member is moved reciprocatingly.

6. A device for driving a copy board of a copying machine as claimed in claim 1 or 2, wherein the copy board is provided with abutment surfaces on both its sides as viewed in the direction of the reciprocating movement, and wherein said stopper means includes stoppers are disposed at both sides of the copy board for engagement with respective abutment surfaces.

7. A device for driving a copy board of a copying machine as claimed in claim 6, wherein the abutment surfaces on the copy board or the stoppers are made of an elastic material.

8. A device for driving a copy board of a copying machine as claimed in claim 1 or 2 wherein said releasable engagement means whereby said copy board is releasably engaged with said driving member comprises a resilient member having a groove therein attached to said copy board and an adjustably positionable projecting member attached to said driving member and releasably engaged with said groove in said resilient member.

9. A device according to claim 8 wherein said resilient member includes sloped surfaces on opposite sides of said groove, which surfaces are engageable by said projecting member to enable said driving member to move said copy board against said stopper means prior to reengagement of said projecting member and said groove.

* * * * *